Dec. 15, 1931.    H. H. NORMAN    1,836,865
MEANS FOR CONNECTING DERRICK SECTIONS
Filed Feb. 13, 1929
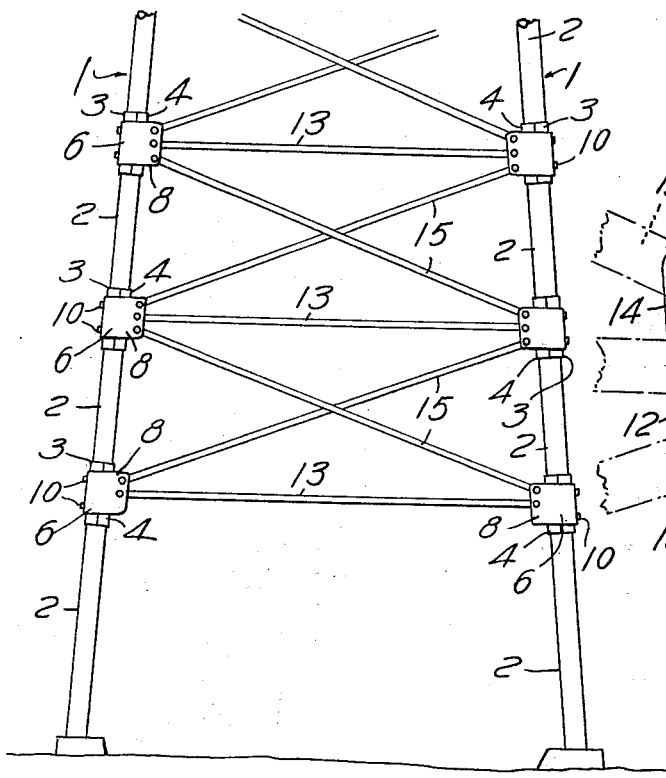
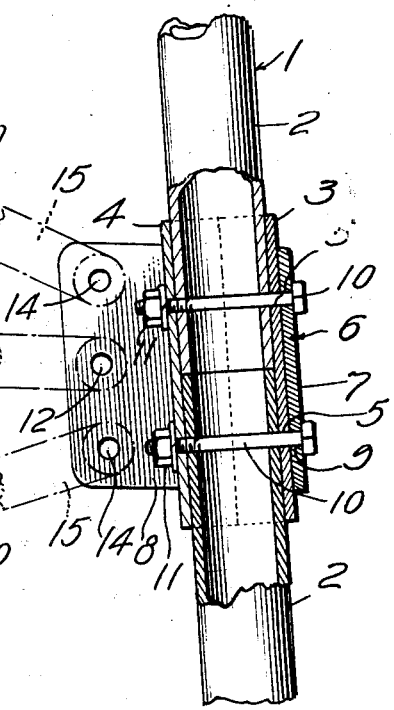
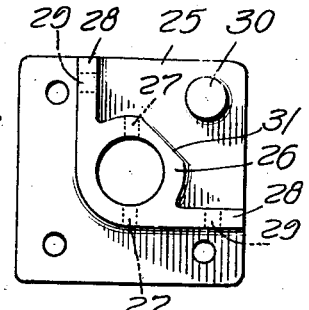
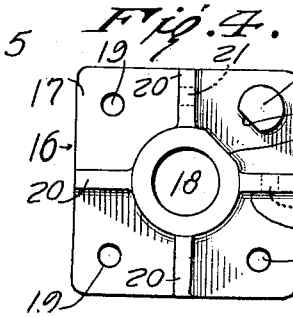
Inventor
H. H. Norman.
By Jack R. Richmond
Attorney

UNITED STATES PATENT OFFICE

HAROLD H. NORMAN, OF EL DORADO, ARKANSAS

MEANS FOR CONNECTING DERRICK SECTIONS

Application filed February 13, 1929. Serial No. 339,666.

This invention is directed to an improvement in means for connecting the otherwise separable sections of the leg or upright of a derrick or the like, with such means when in assembled relation forming a connector between the meeting ends of the leg sections and a substantial brace against the usual stresses to which such leg sections are subjected.

In elevated towers and derricks, the supports proper are made up of a series of comparatively short sections which are connected end to end to provide a support or leg of the desired length with the respective legs interbraced one from the other. As the leg sections are of comparatively short lengths for convenience in assemblage and dismantling, it is vitally necessary that means be provided to connect the meeting ends of the sections against the strains and stresses to which the legs are subjected in the use of the derrick, and it is important in this connection that the connecting means be so formed as to insure a rigid joint between the sections which must be conveniently designed for connection and disconnection and which preferably should provide for connecting the respective brace members between the legs adjacent the joint between the leg sections.

The primary object of the present invention, therefore, is the provision of a connector at the meeting ends of the leg sections involving a jointing element made up of separable sections adapted when in position to completely or substantially completely enclose the leg sections overlying and extending in both directions beyond the meeting ends, with the connector including a girt collar formed for the reception of the ends of the interbraces and overlying and partially embracing the jointing element, with the parts arranged so that through bolts may simultaneously unite into a substantially unitary connector the girt collar, jointing element sections and leg sections.

A further object of the invention is the provision of a cap plate for the leg sections wherein provision is made for a substantial connection with the leg section and for the connection of the brace members and also the provision of a foot plate designed to receive and support the lowermost leg section and also formed for the cooperation of braces therewith.

The invention is illustrated in the accompanying drawings, in which:

Figure 1 is a broken view in elevation showing a portion of the derrick support or legs with the improved connectors in place and the braces applied.

Figure 2 is an enlarged vertical section through the connector and leg sections.

Figure 3 is a perspective view of the connector, the parts being shown separated.

Figure 4 is a plan of the head plate.

Figure 5 is a plan of the foot plate.

The derrick support as here shown is made up of legs 1 formed of several sections 2 of comparatively short lengths disposed in end to end relation to provide legs of the desired length.

The respective sections making up the leg are connected at their meeting ends by a connector with which the present invention is particularly concerned. This connector includes what may be called a jointing element made up of two sections 3 and 4 interiorly conforming to the exterior shape of the leg sections and of such dimensions that when applied they will embrace and closely fit the meeting ends of the leg sections and substantially enclose such ends.

The jointing element sections are of course of a length to extend a substantial distance above and below the meeting ends of the leg sections, and such jointing element sections as well as the leg sections are formed with bolt-receiving openings 5 which are to register, when the jointing element sections are in position, to permit the application of securing bolts, as hereinafter referred to.

A girt collar, indicated at 6, is arranged to cooperate with and form a substantial part of the connector, this girt collar being of conventional form in that it involves a central portion 7 adapted to substantially conform to and overlie one of the sections of the jointing element, and radiating wings 8 which, when the girt collar is in position, flare outwardly from the leg sections in the usual manner. The girt collar is formed with openings 9 adapted, when the collar is in position as a part of the connector, to register with the bolt-receiving openings 5 in the jointing element sections and leg sections, and in assembling the connector bolts 10 are passed through these registering openings 9 and 5 and terminally secured by nuts 11, whereby the girt collar and jointing element sections and leg sections are securely united as a unitary element, serving as an effective brace against the strains and stresses to which the leg sections may be subjected at or adjacent the joint.

It is to be particularly noted that the jointing element forms a complete enclosure and therefore in itself a substantial brace against the displacement or bending strains and stresses of the leg sections at their meeting ends, and that the application of the girt collar materially adds to this bracing effect by reinforcing the jointing element at the leg joint and in both directions beyond the same, with the entire connector rendered a substantially unitary structure by the through bolts. Thus, the leg sections are effectively braced and connected against all usual and ordinary strains and stresses, with the parts of the connector so arranged and disposed that they may be conveniently assembled or separated in a simple and expeditious manner in making up or dismantling the legs.

The respective wings 8 of the girt collars of each connector are formed with openings 12 for the connection to such girt collar of the usual girt braces 13, the girt collar and wings being further formed with upper and lower openings 14 for the reception of the usual diagonal braces 15.

A head plate 16 is provided to engage the upper end of the uppermost leg section to support the derrick parts. This head plate includes a plate section 17 of substantial dimensions, centrally of the lower side of which is formed a socket member 18 into which the upper end of the uppermost leg section is snugly fitted, said socket and cooperating portion of the leg section being formed with openings 19 for the reception of through bolts by which the head plate may be secured to the leg section. The socket is braced by webs 20 radiating therefrom, two of which are formed with openings 21 for the connection of the diagonal braces. The head plate is further formed with a depending lug 22, the inner peripheral margin of which is cut away, as at 23, and the correspondingly diagonally opposite portion of the socket 18 is also cut away at 24, providing plane parallel bearing surfaces to receive and hold the diagonal braces against displacement and at the same time assist in the rigid connection between the head plate and leg sections.

A foot plate is also provided for the reception of the lower end of the lowermost leg section. This foot plate includes a flat bearing section 25 of appropriate dimensions to serve as a support, a socket 26 rising from this plate to snugly receive the lower end of the lowermost leg section. The socket and leg section are formed with openings 27 for the reception of through bolts to secure the foot plate and leg section together.

The socket 26 is braced by webs 28 tangentially to the socket and in relatively right angled relation, each of the webs being formed with openings 29 to receive the ends of the braces. The foot plate is formed beyond the socket with an upstanding stud 30, and the exterior surface of the socket opposite the stud 30 is cut away to present a plane surface 31 to permit the passage of the braces and hold them in fixed relation to the foot plate to assist in bracing the parts.

It will of course be understood that if desired the bolts 10 and the corresponding portions of the openings 9 and 5, or if preferred a particular portion or portions of the bolts and the corresponding openings, may be of angular formation of any usual or well understood form to prevent independent turning of the bolts when in applied position. This facilitates the application and removal of the nuts 11 without the necessity of holding the bolts during the operation.

What is claimed to be new is:

1. A connector for the meeting ends of leg sections of a derrick or the like, including a jointing element made up of separable half sections to envelop the leg sections adjacent and in both directions materially beyond their meeting ends, a girt collar overlying and conforming to one of the jointing element sections, and bolts uniting the girt collar, the jointing element sections and leg sections as a unitary clamping connector.

2. A connector for the meeting ends of leg sections of a derrick or the like comprising a jointing element made up of independent sections to be applied to the leg sections at their meeting ends, said jointing element sections enclosing the leg sections at the joint and extending above and below the joint, a girt collar having a central portion conforming to and overlying one of the jointing element sections and having wings radiating from such conforming part, and bolts passing simultaneously through the conforming portion of the girt collar, bolt jointing element sections and the leg sections to utilize the jointing element as a completely enveloping brace and connector and to utilize the girt collar as a brace for the jointing element and for the leg sections.

3. A connector for the meeting ends of the leg sections of a derrick or the like, made up in three parts, two of said parts serving when applied to enclose the leg sections at their meeting ends and the third part serving to overlie and conform to one of the first parts and to additionally provide for bracing connections between the legs, and means for uniting all of said parts in unitary connection with the leg sections, whereby the strain of the bracing connections is resisted by two of said parts of the connector before reaching the leg sections.

4. A connector for the meeting ends of the leg section of a derrick or the like, including a jointing element made up of separable half sections to together provide a sleeve for inclosing the meeting ends of the leg sections and extend in both directions beyond the junction of such leg sections, and a girt collar overlying and conforming to one of the half sections and diverging wings extending from the conforming portion of the girt collar substantially at the line of juncture between the half sections, and bolts passing through the conforming portions of the girt collar, half section, and leg sections on one side and through the leg sections and remaining half section on the other side, with the bolts' terminal securing means accessible from between the diverging wings.

5. A connector for the meeting ends of the leg sections of a derrick or the like, including a jointing element wholly free normally of connection with the leg sections and made up of half sections to together encircle the leg sections at the meeting ends of such sections and extend materially beyond such meeting ends in both directions, and a girt collar overlying one of said half sections, and removable securing means extending through the girt collar, both half sections, and the leg sections, one of said half sections and girt colar having conforming portions.

In testimony whereof I affix my signature.

HAROLD H. NORMAN.